United States Patent [19]
Jacobsen et al.

[11] Patent Number: 5,936,411
[45] Date of Patent: Aug. 10, 1999

[54] APPARATUS AND METHOD FOR MEASURING STRAIN WITHIN A STRUCTURE

[75] Inventors: Stephen C. Jacobsen; Michael G. Mladejovsky; Mark R. Whitaker; Brian J. Maclean, all of Salt Lake City, Utah

[73] Assignee: Sarcos L.C., Salt Lake City, Utah

[21] Appl. No.: 08/980,325

[22] Filed: Nov. 28, 1997

[51] Int. Cl.$^6$ ........................................ G01R 27/26
[52] U.S. Cl. .................. 324/662; 324/687; 73/862.626
[58] Field of Search .................... 324/661, 662, 324/671, 676, 678, 683, 687; 73/862.046, 862.626, 862.68; 340/870.37

[56] References Cited

U.S. PATENT DOCUMENTS

| | | | |
|---|---|---|---|
| 4,733,235 | 3/1988 | Baer et al. | 324/683 |
| 4,743,902 | 5/1988 | Andermo | 324/683 |
| 5,237,284 | 8/1993 | Van Der Valk | 324/662 |
| 5,304,937 | 4/1994 | Meyer | 324/662 |
| 5,461,320 | 10/1995 | Strack et al. | 324/662 |

*Primary Examiner*—Diep N. Do
*Attorney, Agent, or Firm*—Thorpe North & Western, LLP

[57] ABSTRACT

A method and apparatus for measuring displacement of one location of a structure, relative to another, spaced apart location. The apparatus includes a first array of conductive elements disposed on the structure and attached at said one location; a second array of conductive elements disposed on the structure adjacent the first array and attached at said other, spaced-apart location such that displacement of said one location with respect to said other, spaced-apart location can be measured by measuring the first array position with respect to the second array position; a source for supplying an electric current to the first and the second array of conductive elements to develop a unique charge between each conductive element of the first array and each respective conductive element of the second array, wherein the unique charge that is stored between each pair of conductive elements changes when the relative position of the first array changes with respect to the second array and the change in charges corresponds to the displacement of the one location with respect to the other, spaced apart location.

6 Claims, 9 Drawing Sheets

APPARATUS AND METHOD FOR MEASURING STRAIN WITHIN A STRUCTURE

BACKGROUND OF THE INVENTION

1. The Field of the Invention

This invention relates generally to apparatus and method for sensing displacements, and more particularly to a highly accurate apparatus and method for measuring translational displacements.

2. The Background Art

Structural health monitoring of objects has been of interest ever since objects or structures such as aircraft, buildings, bridges, etc., were developed. Numerous techniques have been used to determine the point at which the structure will fail. For example, one technique used to monitor the "health" of an object or structure has simply been to keep track of the age, i.e., when a structure gets older, it becomes weaker, thus, approximate life span of a structure has been used to monitor the health of the structure. Another technique to monitor "health" of a structure has been to maintain records of the activities which the structure has performed or been involved with. Yet another technique has been to monitor the size of cracks in the structure. More recently, "health" monitoring has been accomplished through electronic circuitry such as an extensometer sensor.

Extensometer sensors measure relative displacement such as bending, compression, or stretching of a structure. For example, such sensors can be used to detect the load (or strain) of a physical structure or to calculate the number of strain cycles through which a physical structure has passed and at what level of stress each strain cycle induced in the structure. When the sensors are used in this manner, they are commonly referred to as strain sensors or strain gages.

Prior art strain sensors were commonly placed within the physical structure to monitor strain and wear of the structure, from which an estimate of the life expectancy of a structure could be made and safety precautions taken to prevent accidents that might result if the structure were to fail. Information on the life expectancy of a structure is also useful in determining when a physical structure should be repaired or removed from use.

An area where life expectancy estimates would be of special value is in aircraft maintenance. As aircraft fleets age and exceed initial design lifetimes, inspection and maintenance issues become increasingly important. Another area where life expectancy estimates are of particular value is in buildings or bridges. Knowing the existing strength or safety level of buildings and bridges can prevent disasters which may not otherwise be avoided. As such, interest in developing structural monitoring systems has grown significantly in recent years.

One drawback of typical prior art strain sensors is that they are imbedded within a structure to be monitored, and this, of course, weakens the structure. Other drawbacks of typical prior art strain sensors are (i) labor intensive installation requirements, (ii) analog outputs which drift and require frequent calibration, (iii) extensive wiring and shielding requirements, and (iv) single use characteristics.

OBJECTS AND SUMMARY OF THE INVENTION

It is a primary object of the present invention to provide a method and apparatus for producing information representing a strain induced displacement of a structure, the information being represented as digital data.

It is another object of the invention to provide such a method and apparatus for producing information representing precise measurement of a strain induced displacement of a structure.

It is also an object of the invention to provide such a method and apparatus for instantaneously measuring displacement caused by strain in a structure.

It is still another object of the invention to provide such apparatus which is reduced in size.

It is an object of the present invention to provide such a method and apparatus for making strain measurements of a structure without weakening the structure in which the strain is being measured.

The strain sensing approach of the present invention utilizes the capacitive coupling between an array of electric field emitters displaced relative to an array of detectors, when displacement occurs on a structure on which the array of field emitters is attached (at one location) and the array of detectors is attached (at another spaced-apart location). The emitter and detector arrays are arranged to form a vernier pattern so that the very small translational displacement of one array relative to the other may be detected.

The apparatus also includes a source for supplying an electric voltage to the array of emitters for developing a predictable charge on each detector. For each position of the emitter array with respect to the detector array, there is a characteristic pattern (waveshape) of charges across the detector array. These charges change in a systematic and predictable manner when the relative position of the emitter array changes with respect to the detector array. Also included is a converter for converting the instantaneous charge on each detector into a digital value, circuitry for storing each digital value in a memory and for retrieving each digital value from the memory, and circuitry for determining the position of the emitter array with respect to the detector array based upon the digital values stored in the memory.

In accordance with one aspect of the invention, the circuitry for determining the position of the emitter array relative to the detector array includes: a template generator for generating a plurality of waveforms (templates), each being similar to the pattern (waveshape) of charges across the detector array; a correlator which calculates the correlation between the template waveform and the detector waveshape or waveform; a search engine or processor which successively correlates different template waveform alignment or phase with the detector waveform to find the best alignment or phase match, i.e., that which produces a nearly zero correlation; and circuitry for indicating the position of the emitter array, derived from the best alignment or correlation between template waveform and detector waveform.

Additional objects and advantages of the invention will be set forth in the description which follows, and in part will be apparent from the description, or may be learned by the practice of the present invention. The objects and advantages of the invention may be realized and obtained by means of the instruments and combinations particularly claimed in the appended claims.

BRIEF DESCRIPTION OF THE DRAWINGS

The above and other objects, features, and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the appended claims.

In general, the invention comprises a sensor that produces a digital value corresponding to strain on a structure on which the sensor is mounted. In a preferred embodiment, the digital value is a 15 bit signal, but could easily be a digital value represented by a different number of bits. The digital value is calculated by measuring the position of an emitter array attached to the structure, with respect to a detector array also attached to the structure but at a different location. The position of the emitter array relative to the detector array is a function of the position or movement in the structure upon which the emitter and detector are mounted. For example, if the structure were to flex, the relative position of the emitter with respect to the detector would change due to the flexure of the structure and thus the digital value would change. In other words, the sensor produces a digital value that corresponds to a strain in the structure.

The digital value produced is passed to a processor where it is analyzed in view of all the digital values produced by the sensor and a desired result can be determined, e.g., the loading of the structure, the residual strength of the structure, the strain cycles of the structure, or other parameters of the structure.

Figure 1:
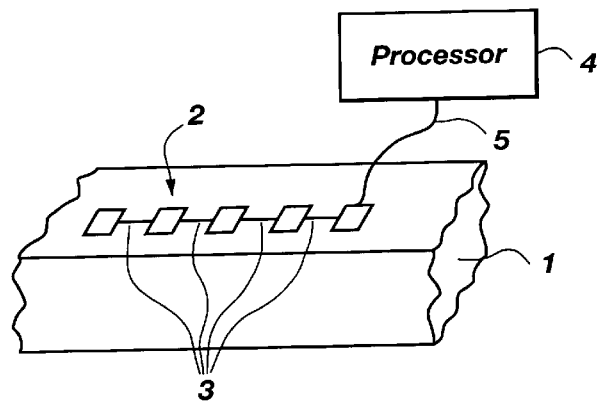
FIG. 1 is a perspective view of a structure on which a network of sensors is installed, in accordance with the present invention.

FIG. 1 illustrates a network of sensors 2 mounted on a load bearing structure 1, the load bearing structure being a bridge, an airframe or other such load bearing structure. Five sensors are shown in the network 2 coupled together by conductors as needed. A processor (or general purpose computer) 4 is shown connected to the network of sensors 2 for receiving information from which strain may be measured simultaneously at multiple locations in the structure. Each of the sensors of the network 2 communicates its strain information to the processor 4 when the information is requested by the processor.

It should be noted that although the sensors are shown on a load bearing structure in FIG. 1, the sensors of the present invention can be used apart from such a structure. In particular, the sensors 2 provide a value corresponding to the distance between two discrete points, and these two points could be in space, on some other structure that does not bear a load, etc.

Figure 2:
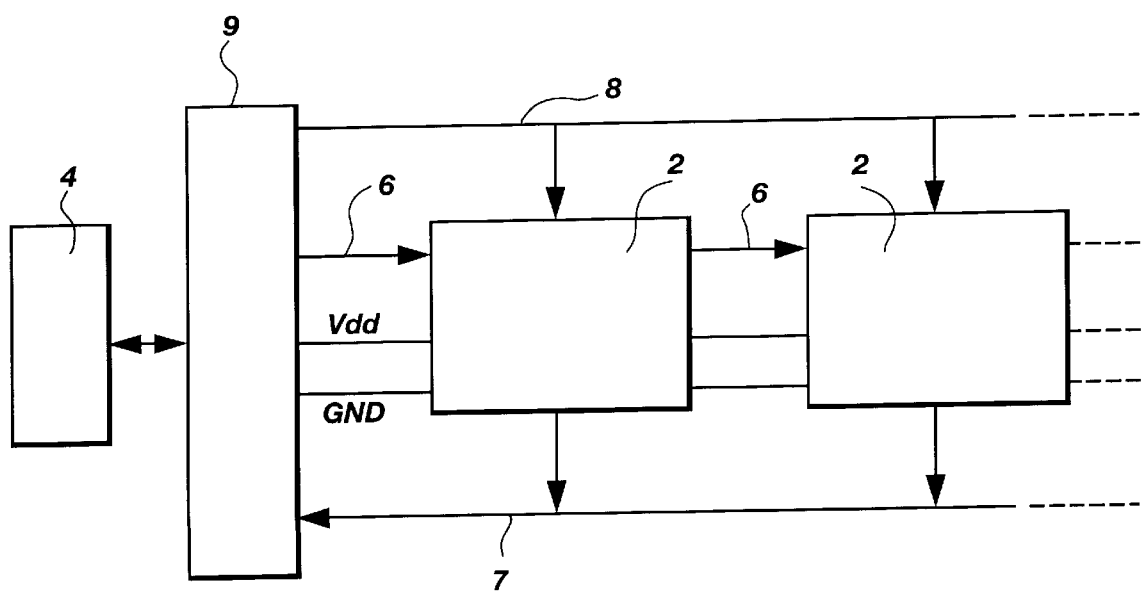
FIG. 2 is a block diagram of the network of sensors of FIG. 1, shown in more detail.

FIG. 2 illustrates a more detailed version of the interactions between the sensors 2 and the processor 4. The network of sensors 2 of FIG. 1 is shown in a partial view. These sensors 2 are connected in a five wire arrangement, i.e., Vdd (supply voltage), GND (ground), token 6, data 7, and clock 8. A bus controller 9 represents an interface with processor 4 and allows the network of sensors 2 to communicate with the processor.

Figure 3:
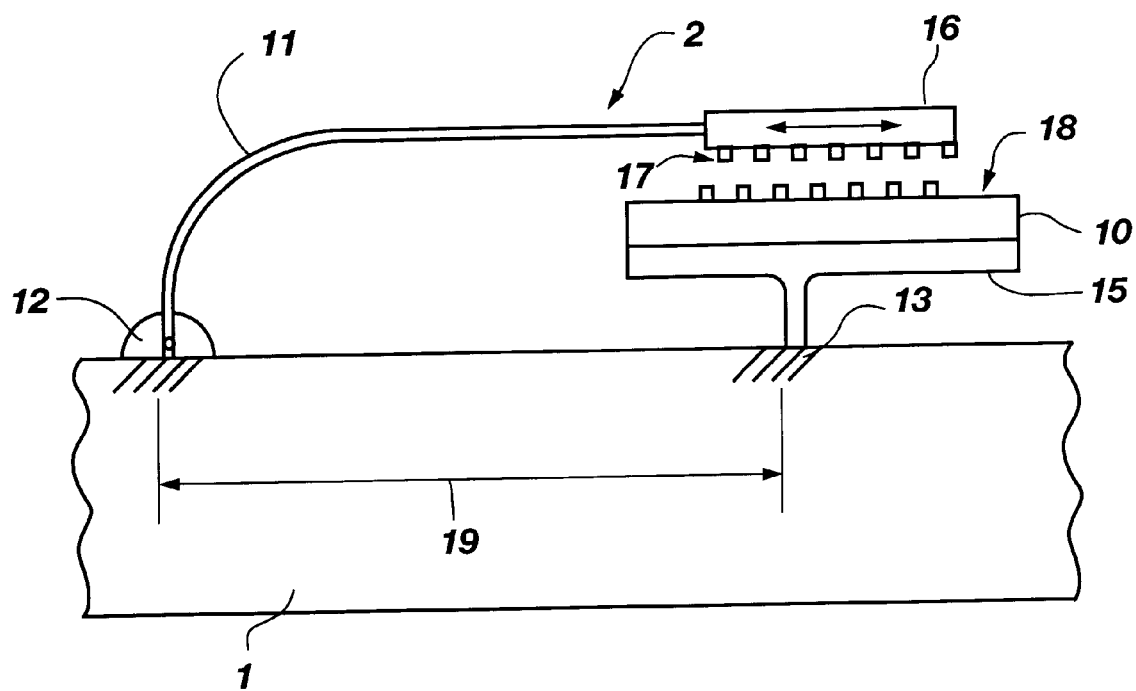
FIG. 3 illustrates a side view of an illustrative mechanical configuration of a sensor of the present invention mounted on a structure.

FIG. 3 illustrates schematically, in side view, a mechanical configuration of a preferred embodiment of a sensor 2 of the present invention. The sensor 2 is attached to the structure 1 at two spaced apart locations. An arm 11 made of a stiff material is attached to a first location 12 on the structure 1 while an integrated circuit (IC) chip 10 is attached to a second location 13 by means of a base 15. The arm 11 extends from the first location 12 to a point above the second location 13 where an emitter array 16 with a plurality of conductive fingers 17 is coupled to the arm. The emitter array 16 is positioned adjacent the IC chip 10 and generally parallel to an array of detectors 18 formed on the IC chip 10. The emitter array 16 moves laterally (in the directions indicated by the arrow) relative to thedetector array 18 when the first location 12 of the structure 1 moves translationally with respect to the second location 13. Thus, any compression, stretching, or bending of the structure 1 causes the emitter array 16 to move laterally with respect to the detector array 18. In other words, a change in gauge length 19 of the structure 1 causes the emitter array 16 to move relative to the detector array 18.

Figure 4:
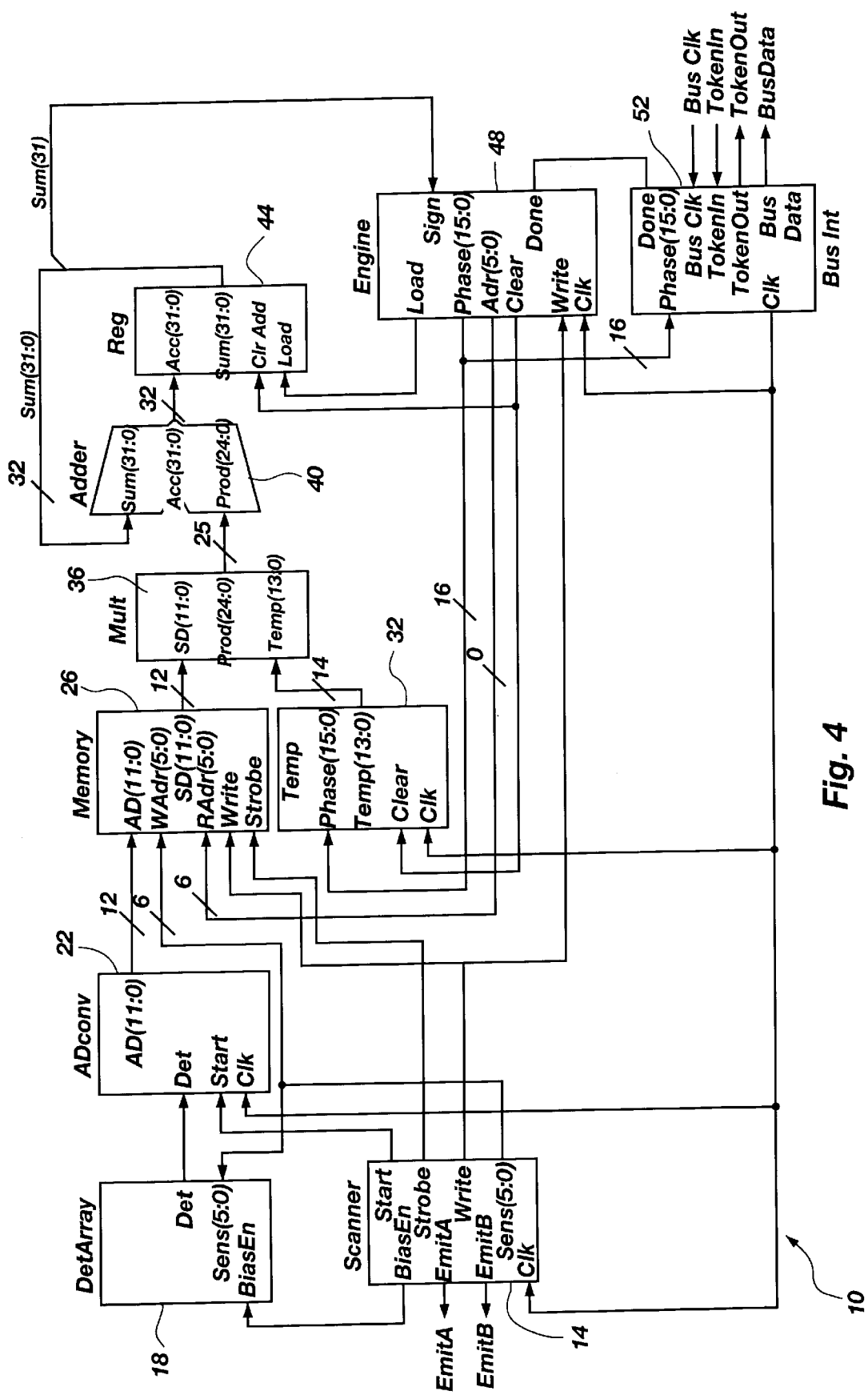
FIG. 4 is a detailed block diagram of an integrated circuit chip for performing displacement calculation in accordance with the present invention.

FIG. 4 is a block diagram of one embodiment of position calculating circuitry of the present invention which includes a complementary metal oxide semiconductor (CMOS) integrated circuit (IC) chip 10. The chip 10 includes a scanner state machine 14, a detector array 18, an analog-to-digital converter 22, a memory 26, a template generator 32, a correlator consisting of a multiplier 36, an adder 40, and a register 44, a binary search engine 48, and a bus interface 52. Of particular note is the detector array 18. The operation of the circuitry of FIG. 4 will be discussed momentarily.

Figure 5:
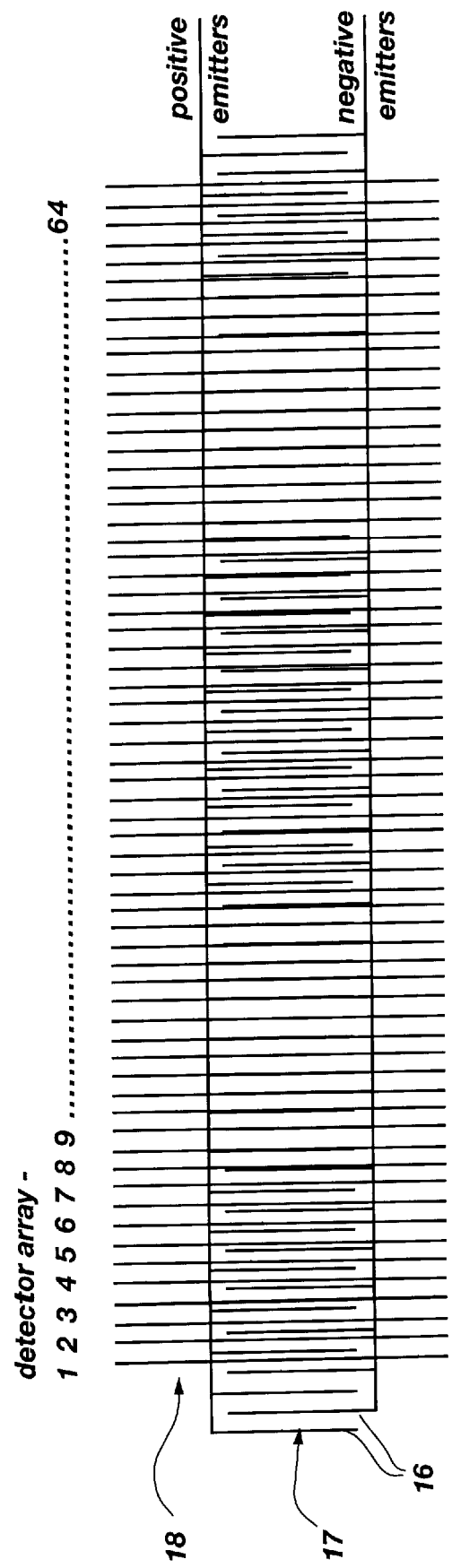
FIG. 5 shows a plan view of a graphics representation of an array of emitters disposed to overlap an array of detectors, wherein spacing of the detectors is slightly offset from the spacing of the emitters in accordance with the present invention.

FIG. 5 is a graphic plan view representation of an array of emitters 16 disposed to overlap an array of detectors 18, in a manner to form a vernier pattern or scale. This is accomplished by spacing apart the detectors slightly different or offset from the spacing of fingers 17 of the emitter. The emitter array 16 is supplied with an analog voltage (to be discussed later), and the spacing difference between emitter fingers 17 and detectors 18 results in each detector "detecting" a slightly different coupled charge than the neighboring detectors. In other words, the detectors 18 will each be charged with a different charge because the capacitance created at each emitter finger/detector overlap is slightly different from that created at the neighboring emitter finger/detector overlaps. The difference in charge from one detector to the next can be represented graphically (FIG. 7) and is hereinafter referred to as a detector waveform.

In addition, FIG. 5 shows a preferred embodiment of an emitter 16 configuration to include two separate but interdigitated arrays, a positive emitter array and a negative emitter array. Each of these emitter arrays has a "comb-like" structure wherein the fingers 17 are analogous to teeth on a comb. These two comb-like emitter arrays are then meshed together to form an interdigitated emitter. This emitter structure provides a detector waveform with enough resolution to perform the desired computations to determine position, displacement or strain.

Figure 6:
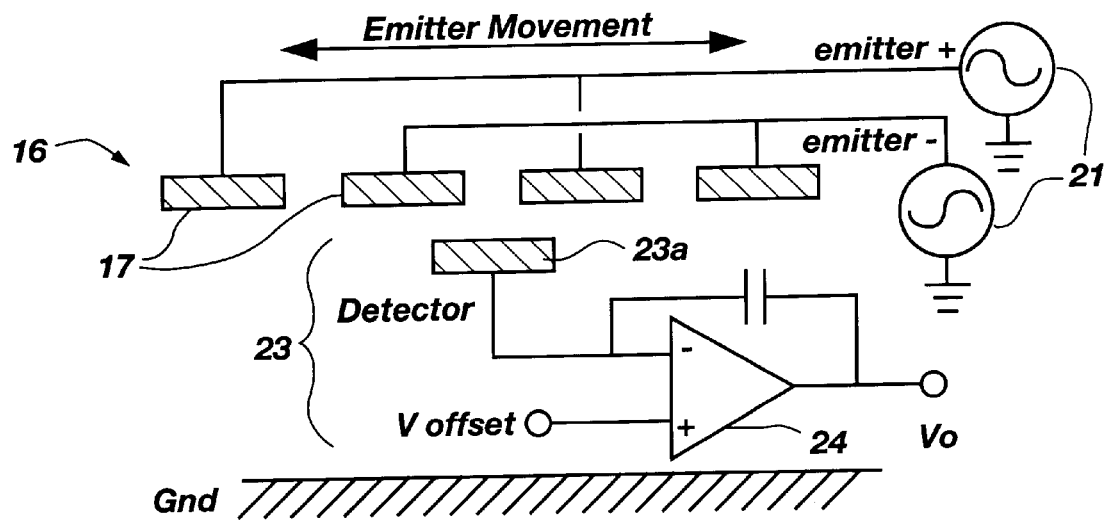
FIG. 6 is a schematic view of an emitter array, a detector, and a charge integrating detector, of the present invention.

FIG. 6 is a schematic view of a charge integrating detector 23 that is representative of all the detectors of the detector array 18 (FIGS. 3 and 5) by which each detector produces a voltage representative of the charges developed on detector electrode 23a. Such charges are developed in response to supply of voltages to emitter fingers 17 by analog voltage sources 21. Detector electrode 23a is connected to an operational amplifier 24 which functions as a charge integrator. Charge coupled to the detector electrode 23a from the voltage driven emitter fingers 17 produces a voltage $V_o$ at the output of the operational amplifier 24. In this manner, each detector of the detector array 18 (FIGS. 3 and 5) produces a voltage that can then be used in further operations to produce a digital value representing position of the emitter array relative to the detector array.

A digital value for any given relative position of the emitter array 16 (FIG. 3) with respect to the detector array 18, is produced in the following manner: (i) analog voltage signals produced by the analog voltage generators 21 (FIG. 6) are supplied to the emitter fingers 17 to thereby induce a charge on each detector of the detector array 18, (ii) the charge on each detector 18 corresponds to a voltage that is converted to a digital signal which is then stored in the memory 26 (FIG. 4) (as noted earlier, when the magnitude of each digital signal is graphically charted, the signals represent a detector waveform [FIG. 7] where each point of the waveform is represented by the corresponding digital signal of each detector in the array), (iii) a template generator 32 (FIG. 4) selectively generates a number of digital signals equal to the number of digital signals of the detector array 18, for use in correlating with the detector array digital signals to ultimately ascertain relative position of emitter array with respect to the detector array (note that when the magnitude of each digital signal is graphically charted, the signals represent a template waveform [FIG. 8] with each point of the template waveform corresponding to a point in the detector waveform), (iv) a multiplier 36 (FIG. 4) multiplies each digital signal of the template waveform with each corresponding digital signal of the detector waveform and the products from each multiplication are summed by the accumulator 40 (FIG. 4)to produce a correlation result, (v) another set of digital signals is generated by the template generator 32 (FIG. 4) and multiplied with the digital signals of the detector and products summed to obtain another correlation result, the cycle being repeated until a particular correlation result is found, and (vi) when the particular correlation result is found, the template waveform used to produce the particular result provides an indication of the relative position of emitter array and detector array, as desired. This indication is a digital value (represented by the template waveform in question) which is then stored for read out or other use.

Figure 7:
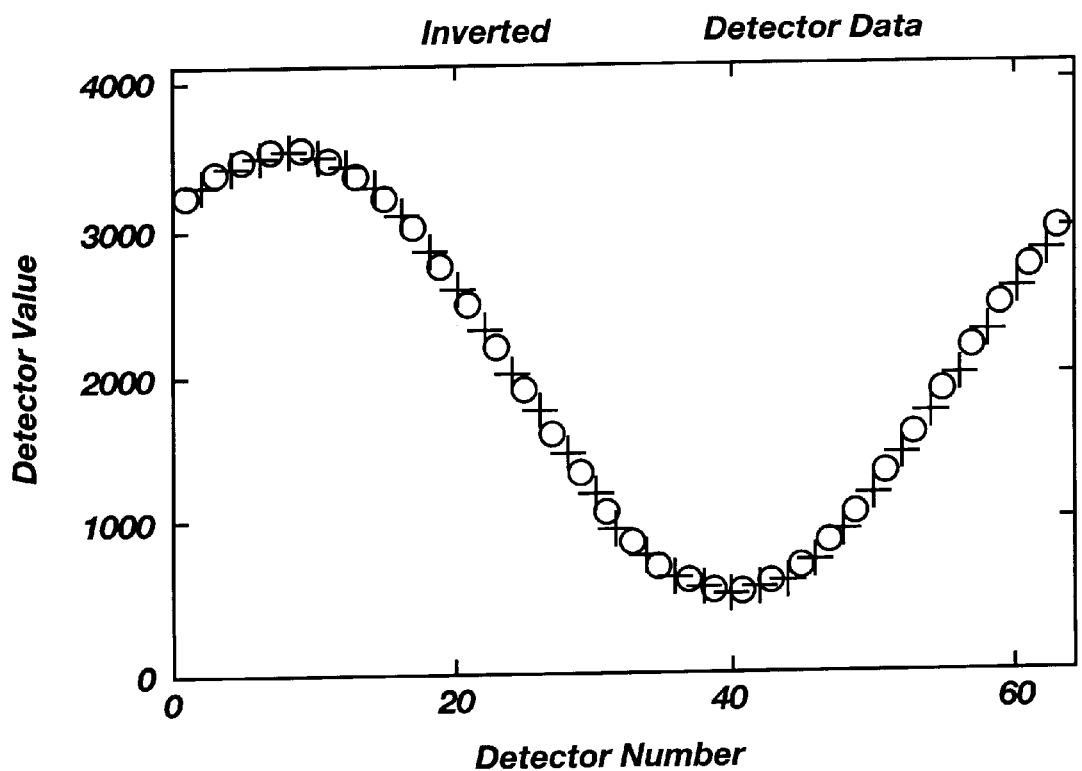
FIG. 7 depicts a graph of illustrative signals (detector waveform) derived from each of 64 detectors at an illustrative position of an emitter array relative to the detector array.

FIG. 7 shows one possible detector waveform that could be generated by the charge distribution to the array of detectors 18. The X-axis represents the detector number and the Y-axis represents the integrated charge (voltage or detector value) on the detector. Very characteristic of the waveform is that it is periodic. The periodicity of the detector waveform is a direct result of the vernier relationship that exists between the fingers of the emitter array 16 (FIG. 3) and the detectors in the detector array (FIG. 3). Although the graph of FIG. 7 illustrates exactly 64 detector voltage values, this is only a preferred embodiment and a different number of detectors could be used in the present invention. In addition, it is not essential to the present invention that the waveform be sinusoidal, but a sinusoidal detector waveform is used in the remainder of the disclosure to represent a periodic waveform.

Figure 8:
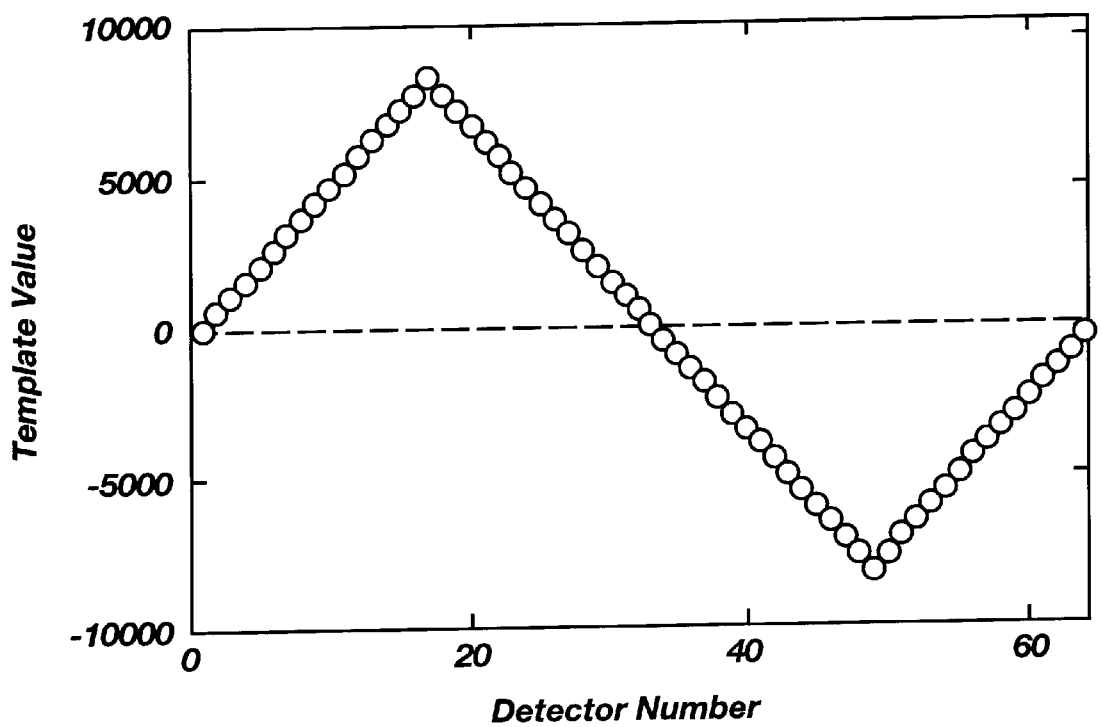
FIG. 8 depicts a graph of illustrative signals (template waveform) generated by a template generator, the signals corresponding to each of 64 template values at one illustrative phase of the template.

FIG. 8 illustrates a template waveform that represents the magnitude of each of the signals that are generated by the template generator 32. In a preferred embodiment, the template waveform is a sawtooth waveform. Although other waveform embodiments are possible, the template waveform produced by the template generator has several required characteristics:

1. There is a one-to-one correspondence between the number of detectors and the number of elements in the template, i.e., 64 detector values require 64 template element values.
2. The progression of each subsequent element from the previous element follows a uniform progression.
3. The sum of the template values for each and every template waveform is zero.
4. There are a multiplicity of sets of template values such that for a 15 bit sensor there are $2^{15}$ (i.e., 32,768) different and unique sets of template values.
5. Each unique set of template values can be determined from a single starting point, which is the y-intercept of the template waveform. This starting point can also be thought of as the "phase" of the template.
6. The template waveform is periodic and possesses the same period at the detector waveform.

Once a set of template values has been produced by the template generator, it is possible to correlate the template waveform with the detector waveform. This is done using the multiplier 36, accumulator 40, and register 44 shown in FIG. 4. The correlation is computed by summing the products of each detector value and each template value. This function can be represented symbolically by the following equation:

$$\sum_{n=0}^{n-1} \text{detector}(n) \times \text{template}(n)$$

where detector(n) represents the "n" detector value and template(n) represents the "n" template value and the products are summed from 0 to (n−1).

Figure 9:
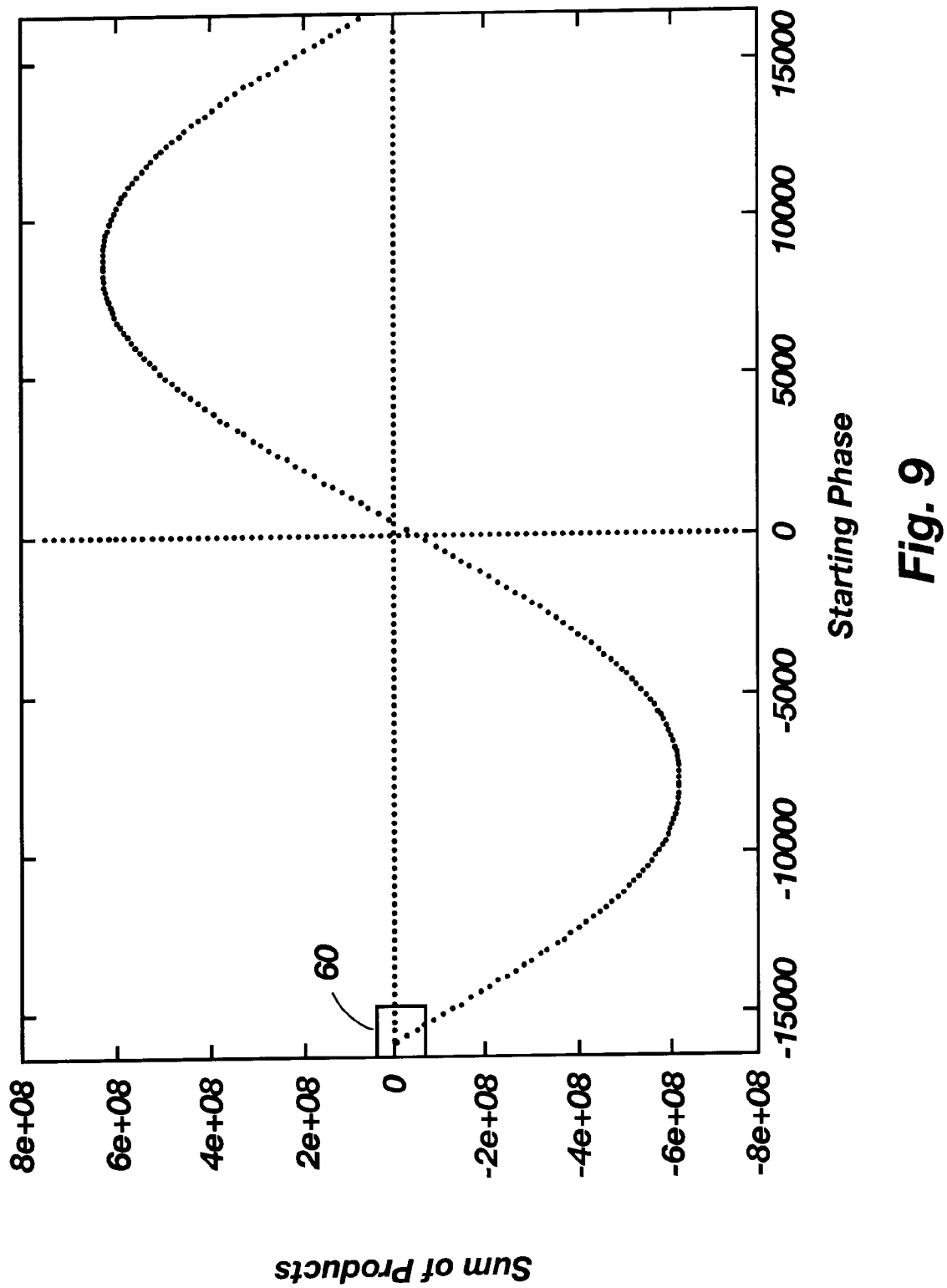
FIG. 9 illustrates an ideal graph of a complete convolution of a template waveform with a detector waveform.
Figure 10:
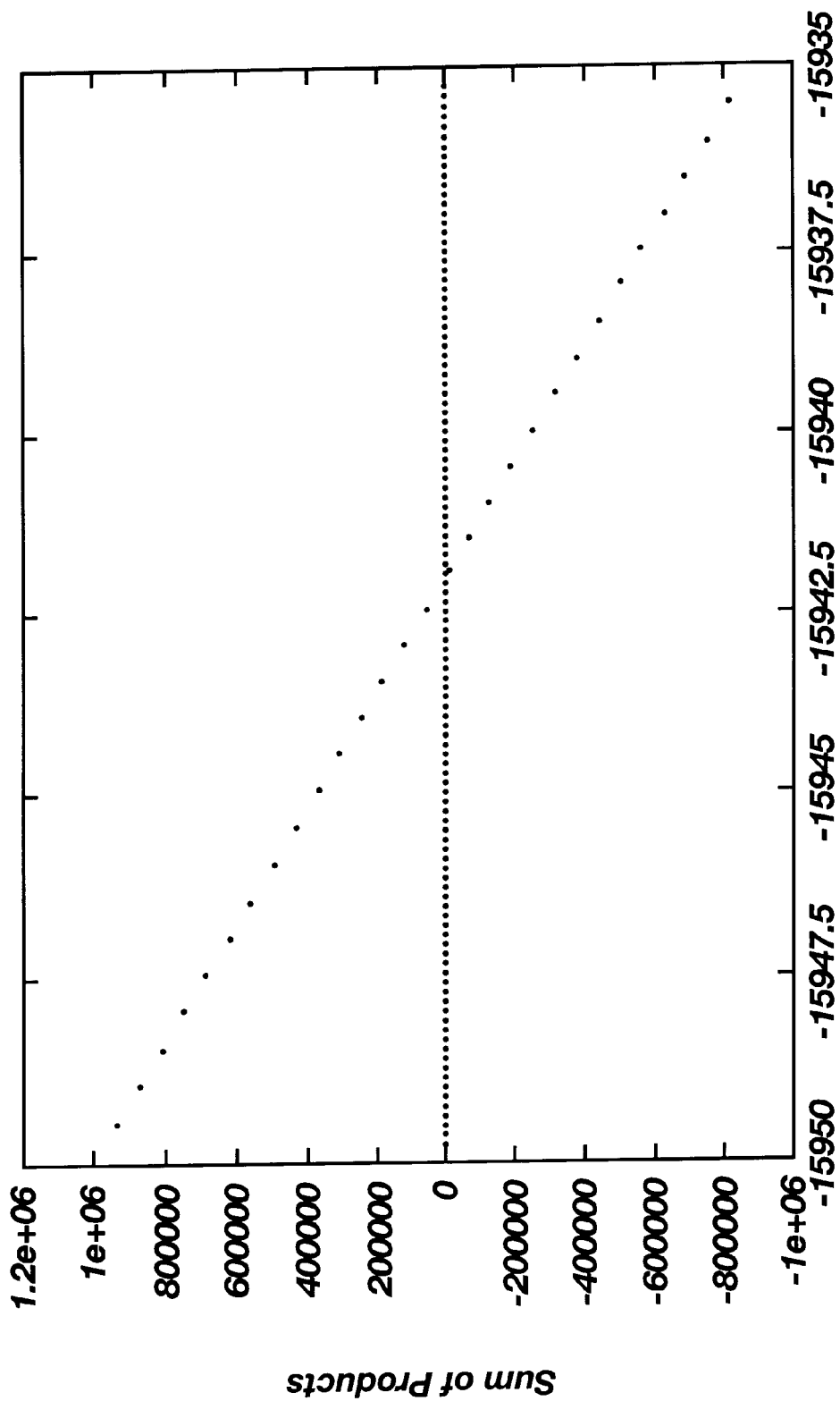
FIG. 10 illustrates an enlarged view of section 60 of the graph of FIG. 9.

If all $2^{15}$ (or 32,768) template waveforms were to be correlated with the single, static detector waveform of FIG. 7, a plot of correlation versus template phase would appear similar to the waveform shown in FIG. 9. Those skilled in the art commonly refer to this operation as a convolution. Of particular relevance is that the waveform of FIG. 9 has two crossings on the X-axis (or two positions where the correlation is zero). FIG. 10 shows the downward crossing 60 (FIG. 9) in zoom to illustrate the details of the crossing. Of interest is the phase of the template waveform when the resultant correlation is zero. This template phase value is the value that represents the position of the emitter array 16 relative to the detector array 18 on the chip 10 at the moment in time that the analog signals on the detector array were converted to digital signals. If the structure to which the sensor is attached were to flex or compress, the position of the emitter array would change with respect to the detector array and the detector waveform would experience a phase shift. Thus, a different detector waveform would be produced. This different detector waveform would produce a different alignment with the template waveforms and thus, the phase of the template waveform which produces a zero correlation with the detector waveform reflects the new position of the emitter array 16 with respect to the detector array 18.

To summarize, the digital value representing the phase of the template waveform corresponding to a correlation closest to zero at a downward crossing of the X-axis of the convolution waveform is representative and proportional to the position of the emitter array 16 with respect to the detector array 18, and indirectly, the strain in the structure at a given point in time. For example, in practice, if two template waveform phase values are subtracted from each other, the difference represents a change in the strain in the structure because the template waveform phase has changed to obtain the new downward zero crossing of the convolution waveform. The template waveform phase only changes when the detector waveform shifts and the detector waveform shifts when the emitter array moves with respect to the detector array which, in turn, only occurs when the strain in the structure has changed. Thus, a change in template waveform phase corresponds to change in the strain in the structure to which the sensor is attached.

It should be noted that the phase of the template waveform which produces a correlation value closest to the downward zero crossing of the convolution waveform is only used to represent one embodiment for determining emitter array 16 position and is used for ease of understanding the present invention. Depending on the application of the present invention, other features of the convolution waveform could be used to gauge an absolute shift of the detector waveform.

In the present invention, the template waveform phase at the downward zero crossing of the convolution waveform is calculated without performing a complete convolution of the template waveform with the detector waveform. For example, in one embodiment, the crossing is determined through a binary search wherein the template waveform is selectively generated at phases corresponding to the center of the remaining interval to be searched. A multiply/accumulate cycle (correlation) is then performed between the selected template waveform and the detector waveform. The particular correlation result is examined to see if it is above or below zero, and a new template waveform is generated depending on the sign of the result. Thus, the phase of the template waveform at the zero crossing is determined without performing all 32,768 calculations required for a complete convolution and a 15 bit template phase value can be determined with only fifteen correlations.

Figure 11:
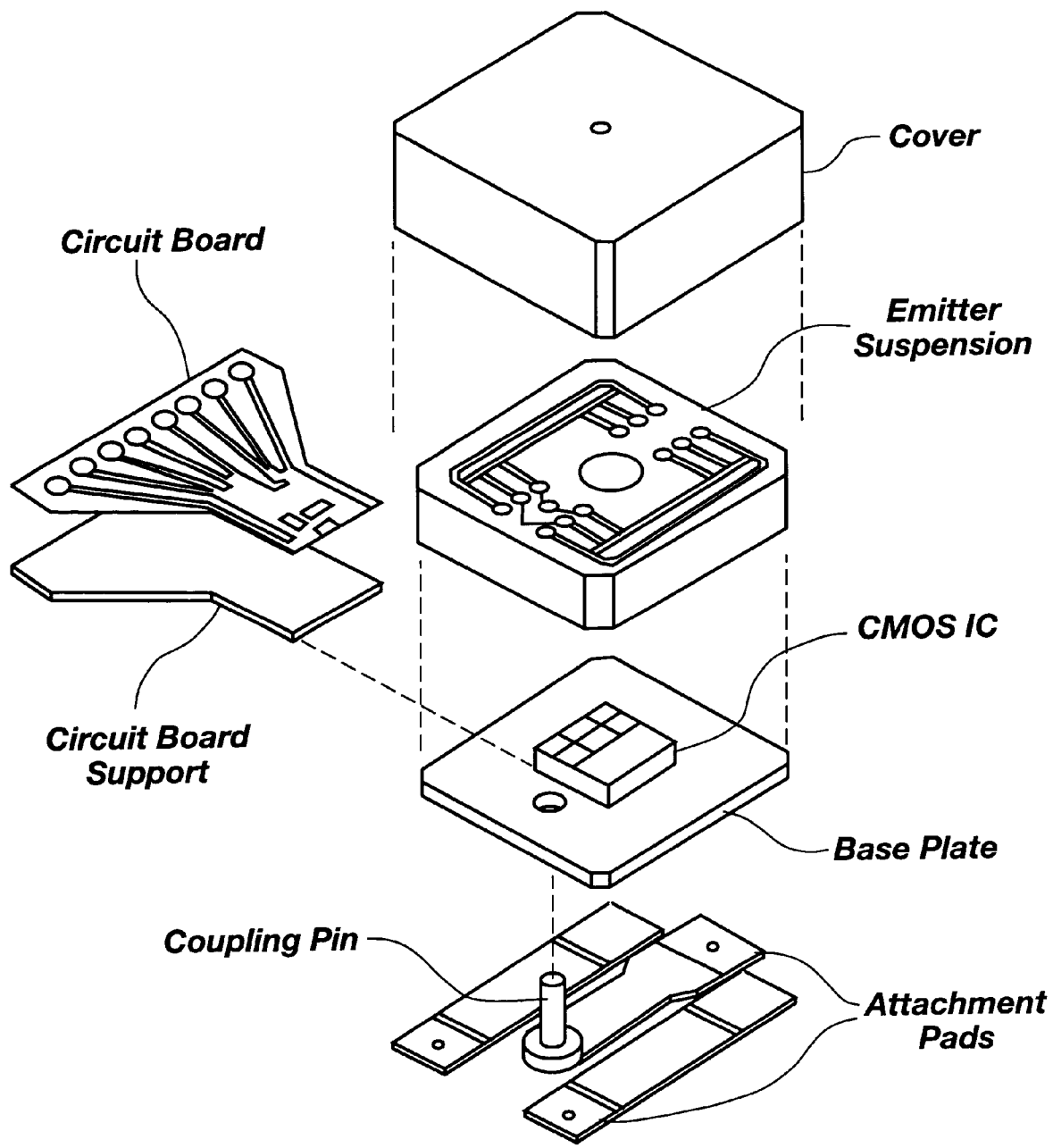
FIG. 11 is an exploded view of a sensor of the present invention packaged in a suitable housing.

Of note is a uni-axial strain transducer (UAST) sensor package that has a 64 element linear array custom IC chip in a transducer package suitable for mounting on a flat surface. The package is illustrated in FIG. 11 and consists of an emitter mounted on a suspension and positioned above a CMOS IC detector mounted on a base plate. The base plate and suspension are coupled to attachment pads on the bottom of the package. The package is mounted on the flat surface with a small amount of adhesive on each of the three attachment pads located on the bottom of the transducer package. Movement of these pads translates lateral strains in the surface into relative motion of the CMOS IC detector and emitter arrays.

Upon viewing this disclosure, those skilled in the art will become aware that the present invention can be accomplished with detectors and emitters other than the charge/voltage detector/emitters described above. For example, photon detectors could be used in combination with photon emitters that are combined with a shadow mask to produce the same effect as the charge distribution on charge detectors. In a similar fashion, photovoltaic or optical detectors could be used. With an alternative detector/emitter combination, the sensor of the present invention could be realized with the same back end circuitry as described above. Thus, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. Apparatus for measuring position of a first location of a structure, relative to a second location of the structure, said second location of the structure being spatially separated from said first location of the structure, said apparatus comprising:

a first array of conductive elements disposed on the structure and attached at said first location;

a second array of conductive elements disposed above the first array and attached at said second location;

means for supplying an electrical voltage to the first array of conductive elements thereby creating an electric field which interacts with the conductive elements of the second array to develop a pattern of charges on the conductive elements of the second array, the pattern of charges developed being dependent on the relative position of the first array with respect to the second array; and means for computing the position of said first location relative to said second location, from the voltage produced by the pattern of charges developed on the second array of elements.

2. Apparatus as in claim 1 wherein the number of conductive elements in one of the arrays is one greater than the number in the other array to form a vernier pattern relationship between the arrays to thereby produce a periodic pattern of charges on the second array.

3. Apparatus as in claim 2 wherein the periodic pattern comprises a sinusoidal waveshape.

4. Apparatus as in claim 2 wherein said computing means comprises means for generating periodic template waveforms of digital values, each template waveform representing a different position of the first array relative to the second array, and means for correlating said pattern of charges on the second array with said template waveforms to determine which template waveform best correlates with the pattern of charges and thus the position of the first array relative to the second array.

5. Apparatus as in claim 4 wherein said computing means further includes means for converting the pattern of charges on the second array into digital signals representing the pattern of charges in an array waveform, and means for storing the digital signals, and wherein said correlating means comprises means for multiplying each digital value of the template waveform with a corresponding digital signal of the array waveforms, means for accumulating the products obtained by the multiplying means, and means responsive to the accumulating means for determining which template waveform best correlates with the array waveform to thereby determine the position of the first array relative to the second array.

6. Apparatus as in claim 1 wherein said first array of conductive elements comprises a pair of interdigitated arrays, and wherein said voltage supplying means comprises means for supplying a positive voltage to one of the arrays of the pair, and a negative voltage to the other array of the pair.

* * * * *